(12) United States Patent
VanderSchuit (10) Patent No.: US 7,311,411 B2
(45) Date of Patent: Dec. 25, 2007

(54) LIGHTED ITEMS

(76) Inventor: Carl R VanderSchuit, 751 Turquoise St., San Diego, CA (US) 92109

( * ) Notice: Subject to any disclaimer, the term of this patent is extended or adjusted under 35 U.S.C. 154(b) by 0 days.

(21) Appl. No.: 10/961,364

(22) Filed: Oct. 8, 2004

(65) Prior Publication Data

US 2005/0083676 A1 Apr. 21, 2005

Related U.S. Application Data

(60) Provisional application No. 60/510,778, filed on Oct. 10, 2003.

(51) Int. Cl.
*F21V 9/16* (2006.01)
(52) U.S. Cl. .................. 362/84; 362/102; 362/806
(58) Field of Classification Search ............. 362/579, 362/577, 101, 102, 109, 118, 806, 800, 253, 362/26, 86; 40/546; 30/123
See application file for complete search history.

(56) References Cited

U.S. PATENT DOCUMENTS

| | | | | |
|---|---|---|---|---|
| 2,663,866 A | | 12/1953 | Simpson | |
| 3,510,643 A | * | 5/1970 | File .................. | 362/26 |
| 4,124,881 A | | 11/1978 | Haber et al. | |
| 4,181,304 A | | 1/1980 | Haber | |
| 4,716,902 A | * | 1/1988 | Swartz .................. | 606/234 |
| 4,890,203 A | * | 12/1989 | Watson .................. | 362/102 |
| 4,914,748 A | | 4/1990 | Schlotter, IV et al. | |
| 5,010,461 A | | 4/1991 | Saotome | |
| 5,070,435 A | | 12/1991 | Weller | |
| 5,119,279 A | | 6/1992 | Makowsky | |
| 5,165,187 A | * | 11/1992 | Shahidi-Hamedani et al. .................. | 40/547 |
| 5,211,699 A | | 5/1993 | Tipton | |
| 5,339,548 A | | 8/1994 | Russell | |
| 5,471,373 A | | 11/1995 | Coleman et al. | |
| 5,545,069 A | | 8/1996 | Glynn et al. | |
| 5,575,553 A | | 11/1996 | Tipton | |
| 5,676,988 A | * | 10/1997 | Coleman et al. .................. | 426/134 |
| 5,784,265 A | | 7/1998 | Chen | |

(Continued)

FOREIGN PATENT DOCUMENTS

GB 2381575 5/2003

(Continued)

OTHER PUBLICATIONS

Pending U.S. Appl. No. 10/606,314 entitled Lighted Hat, VanderSchuit, filed Jun. 25, 2003.

(Continued)

*Primary Examiner*—ANabel Ton
(74) *Attorney, Agent, or Firm*—Harness, Dickey & Pierce, P.L.C.

(57) ABSTRACT

A lighted item generally includes a light-conducting or light-transmission portion integrally defining one or more indicia and a light-transmissive portion. The lighted item also includes at least one light source positioned to emit light into the light-conducting portion, which, in turn conducts or transmits light to the indicia for highlighting the indicia. Light is also conducted or transmitted through the light-conducting portion to the light-transmissive portion for highlighting an element, such as an edible or confection, that is in engaged to the light-conducting portion.

21 Claims, 5 Drawing Sheets

U.S. PATENT DOCUMENTS

| | | |
|---|---|---|
| 5,785,407 A | 7/1998 | Ratcliffe et al. |
| 5,879,068 A | 3/1999 | Menashrov et al. |
| 6,002,079 A | 12/1999 | Shin et al. |
| 6,082,866 A | 7/2000 | Amedee |
| 6,113,886 A * | 9/2000 | Bryan ................... 424/49 |
| 6,135,606 A | 10/2000 | Fernandez et al. |
| 6,254,247 B1 * | 7/2001 | Carson ................. 362/101 |
| 6,273,580 B1 | 8/2001 | Coleman et al. |
| 6,286,974 B1 * | 9/2001 | Rochel et al. ............ 362/86 |
| 6,325,693 B1 | 12/2001 | Rudell et al. |
| 6,354,711 B1 | 3/2002 | McCoy |
| 6,416,198 B1 | 7/2002 | VanderSchuit |
| 6,416,800 B1 * | 7/2002 | Weber et al. ............ 426/104 |
| 6,572,244 B1 | 6/2003 | Clark |
| 6,615,520 B2 * | 9/2003 | Landers et al. ........... 40/546 |
| 6,619,816 B1 | 9/2003 | Johnson |
| 6,641,280 B2 * | 11/2003 | Hanson et al. ........... 362/186 |
| 6,659,619 B2 * | 12/2003 | Gordon ................. 362/109 |
| 6,761,468 B1 * | 7/2004 | Bogal ................... 362/208 |
| 6,824,289 B2 | 11/2004 | VanderSchuit |
| 6,955,450 B2 * | 10/2005 | Johnson ................. 362/253 |
| 7,160,045 B2 * | 1/2007 | Oas ..................... 401/195 |
| 2002/0008970 A1 | 1/2002 | Hanson et al. |
| 2004/0004830 A1 * | 1/2004 | Rudell et al. ............ 362/101 |
| 2004/0136177 A1 * | 7/2004 | Lewis et al. ............. 362/101 |
| 2004/0136189 A1 | 7/2004 | VanderSchuit |
| 2004/0233674 A1 | 11/2004 | VanderSchuit |

FOREIGN PATENT DOCUMENTS

| | | |
|---|---|---|
| GB | 2392973 | 3/2004 |
| WO | WO 02/10642 | 2/2002 |
| WO | WO 2004/005796 | 1/2004 |

OTHER PUBLICATIONS

Pending U.S. Appl. No. 10/606,324 entitled Lighting Device, VanderSchuit, filed Jun. 25, 2003.

Pending U.S. Appl. No. 10/606,325 entitled Light Hat, VanderSchuit, filed Jun. 25, 2003.

Pending U.S. Appl. No. 10/786,995 entitled Therapeutic Device and Methods for Applying Therapy, VanderSchuit, filed Feb. 25, 2004.

* cited by examiner

LIGHTED ITEMS

CROSS-REFERENCE TO RELATED APPLICATION

This application claims priority to U.S. Provisional Application 60/510,778, filed Oct. 10, 2003, the entire disclosure of which is incorporated herein by reference.

FIELD OF THE INVENTION

The present invention relates generally to lighted items, and more particularly (but not exclusively) to items having lighted indicia.

BACKGROUND

Lighted items are available in a wide variety of designs, colors, sizes, and shapes. Despite the wide variety of existing lighted items, the inventor hereof has recognized a need for, among other things, lighted items having one or more indicia that are illuminated or highlighted in a visually stimulating and pleasing manner.

SUMMARY

In one exemplary embodiment, a lighted item generally includes a light-conducting or light-transmission portion integrally defining one or more indicia and a light-transmissive portion. The lighted item also includes at least one light source positioned to emit light into the light-conducting portion, which, in turn conducts or transmits the light to the indicia for highlighting the indicia. Light is also conducted or transmitted through the light-conducting portion to the light-transmissive portion for highlighting an element, such as an edible or confection, that is engaged to the light-conducting portion.

Further areas of applicability of the present invention will become apparent from the detailed description provided hereinafter. It should be understood that the detailed description and specific examples below, while indicating exemplary embodiments of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

DETAILED DESCRIPTION OF EXEMPLARY EMBODIMENTS

A lighted item according to one aspect of the invention generally includes a light-conducting or light-transmission portion integrally defining one or more indicia and a light-transmissive portion. The lighted item also includes at least one light source positioned to emit light into the light-conducting portion, which, in turn conducts or transmits light to the indicia for highlighting the indicia. Light is also conducted or transmitted through the light-conducting portion to the light-transmissive portion for highlighting an element, such as an edible or confection, that is engaged to the light-conducting portion.

In various embodiments of the invention, a lighted item can take on various shapes and forms. Exemplary embodiments of the invention include a lighted iced or frozen confection 100 (FIG. 1), a lighted lollypop 200 (FIG. 2), a lighted snow cone cup 300 (FIG. 3), a lighted cotton candy holder 400 (FIG. 4), a lighted candy ring pop 500 (FIG. 5), a lighted pacifier 600 (FIG. 6), a lighted receptacle 700 (FIGS. 7A and 7B), a lighted label 800 (FIGS. 8A and 8B), a lighted key holder 900 (FIGS. 9 and 10), a lighted coaster and placemat combination 1100 (FIG. 11), and lighted tableware, such as a lighted fork 1200A (FIG. 12A), a lighted spoon 1200B (FIG. 12B), a lighted knife 1200C (FIG. 12C), lighted chopsticks, lighted plates, lighted dishes, lighted glassware, among other tableware and eating utensils, etc.

In various embodiments of the invention, a lighted item includes one or more indicia that are highlighted (e.g., illuminated, backlit, etc.) by light from a light source. This indicia can include a wide range of graphic images, graphic elements, graphic images, designs, artwork, distinctive marks, identifying symbols, company logos, company contact information, text, alphanumeric characters, advertisements, trademarks, trade names, service marks, sports teams insignias, names, monograms, photographs, among others.

Figures 1, 2, 3, 4, 5, 6:
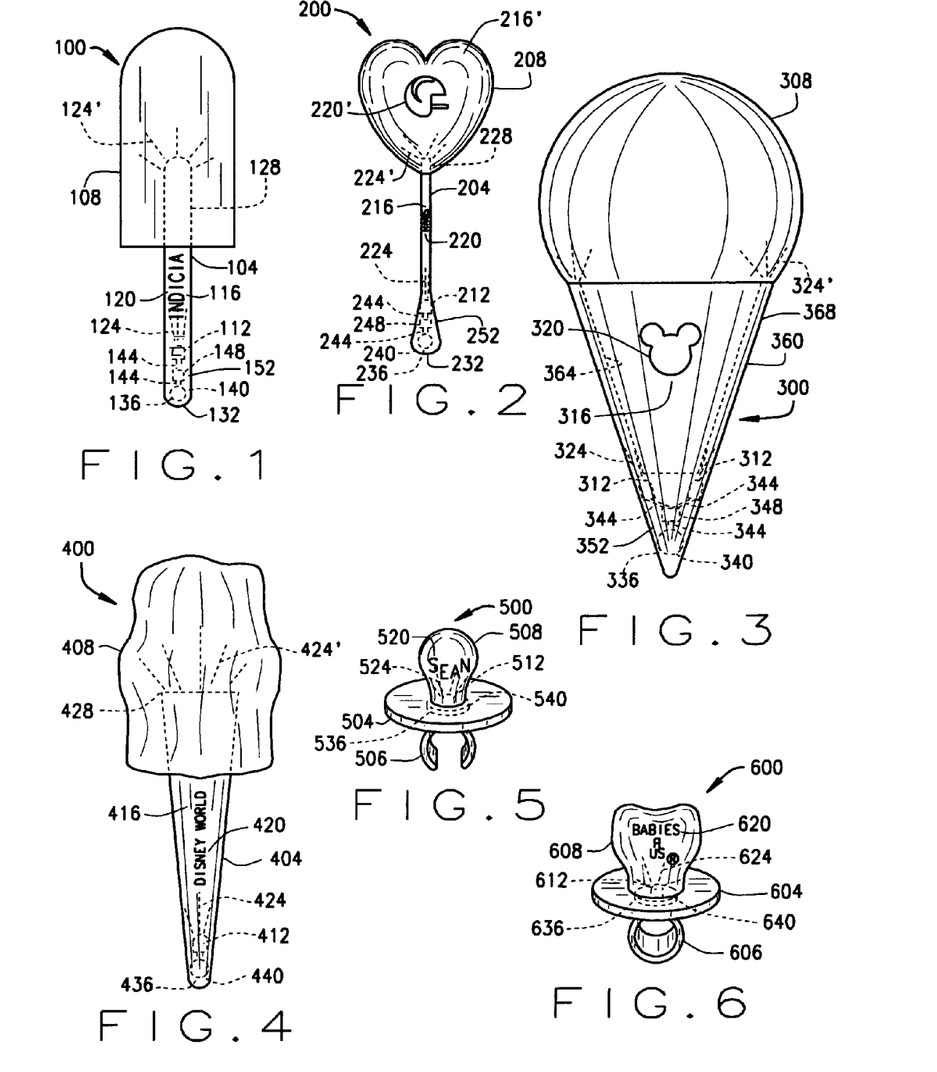
FIG. 1 is a side elevation view of a lighted frozen confection according to one embodiment of the invention.
FIG. 2 is a side elevation view of a lighted lollypop according to another embodiment of the invention.
FIG. 3 is a side elevation view of a lighted snow cone cup according to another embodiment of the invention.
FIG. 4 is a side elevation view of a lighted cotton candy holder according to another embodiment of the invention.
FIG. 5 is a perspective view of a lighted candy ring pop according to another embodiment of the invention.
FIG. 6 is a perspective view of a lighted pacifier according to another embodiment of the invention.

FIG. 1 illustrates an exemplary lighted iced or frozen confection 100, such as a popsicle or ice cream bar. As shown in FIG. 1, the lighted frozen confection 100 includes a popsicle stick 104 and an edible 108 coupled to the popsicle stick 104. The edible 108 can include a variety of frozen confections, including popsicles, fudgsicles, ice cream, flavored ice, among others. The lighted frozen confection 100 also includes at least one light source 112 coupled to the popsicle stick 104.

At least a portion 116 of the popsicle stick 104 is light-transmissive. The light-transmissive portion 116 defines one or more indicia 120 which are highlighted by light 124 from the light source 112. In an exemplary embodiment, the light-transmissive portion 116 includes a translucent plastic material into which is etched "INDICIA" 120. Alternatively, the popsicle stick 104 can include one or more indicia which are light-blocking such that the indicia contrast with the surrounding portions of the popsicle stick 104 through which light 124 passes.

In some embodiments, the light-transmissive portion 116 of the popsicle stick 104 has a higher light transmissibility (allows more light to pass therethrough) than the adjacent portions of the popsicle stick 104. The light-transmissive portion 116 allows light 124 from the light source 112 to pass therethrough, thus becoming externally visible.

In an exemplary embodiment, the indicia 120 are etched or carved (e.g., with a cutting tool, knife, razor blade, laser, chemically etched, drilled, etc.) into the material forming the popsicle stick 104. This etching can increase the light transmissibility of the etched indicia and/or allow the indicia to alter (e.g., capture, refract, disperse, diffuse, diffract, etc.) light traveling within the popsicle stick 104. Etching the indicia 120 can affect the way that the light 124 interacts with the etched indicia 120. For example, with relative deeply carved or etched indicia, the light 124 can be captured in the edges of and thus highlight the indicia 120.

Preferred angle(s) and/or depth at which the indicia are formed into the popsicle stick material can depend on the particular application. In exemplary embodiments, the indicia can be formed (e.g., etched, carved, etc.) into the popsicle stick material at an acute angle of about +/−45 degrees relative to the direction of travel of the light 124.

Figures 12A, 12B, 12C:
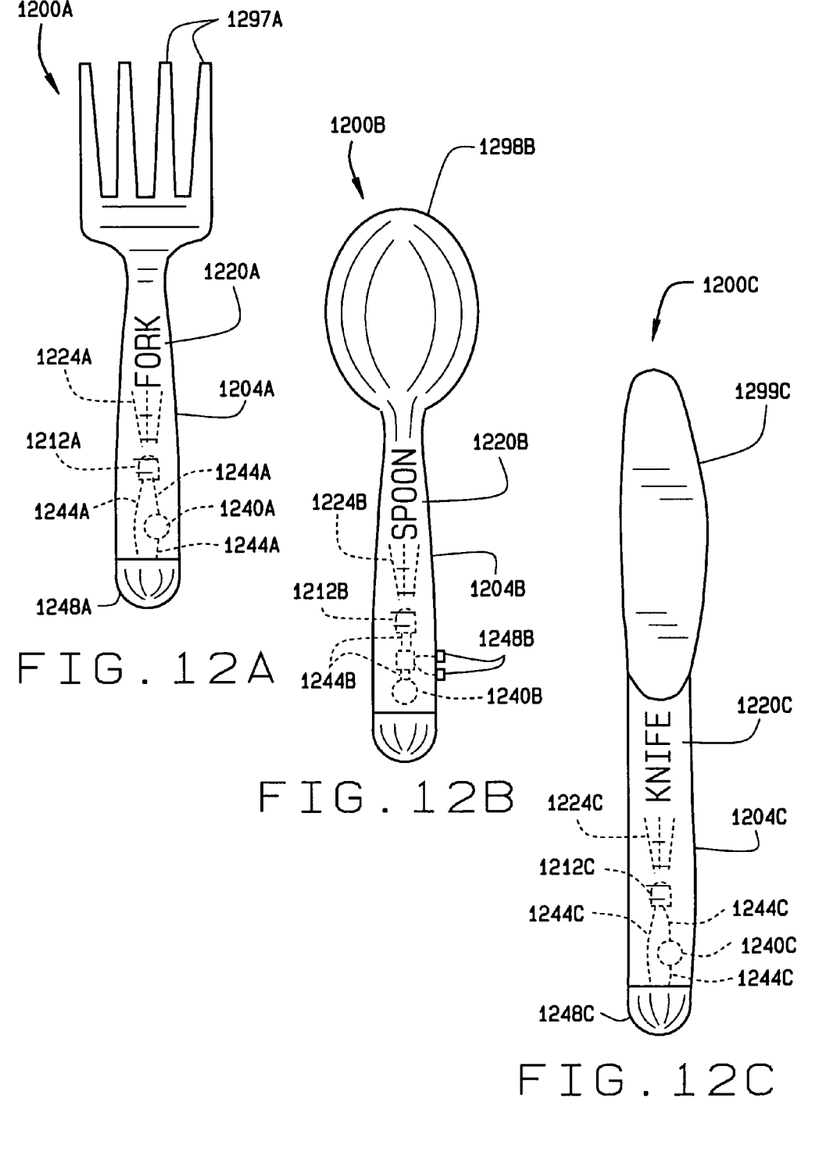
FIGS. 12A, 12B, and 12C are respective views of a lighted fork, spoon, and knife according to another embodiment of the present invention.

The indicia can be etched into an outer or external surface of the popsicle stick material. Additionally, or alternatively, the indicia can be etched into an internal surface of the popsicle stick material. For example, in one exemplary embodiment, the popsicle stick may comprise a two-piece construction. In which case, indicia can be etched into a surface of either or both pieces. Next, the pieces can be arranged such that the surface into which the indicia were etched faces the opposing piece and such that the light source, power source, and conductors are positioned between the pieces. The pieces can then be joined to form the lighted popsicle stick. These exemplary manners by which the indicia can be provided (e.g., etched internally or externally into the popsicle stick) can also be applied to other embodiments of the invention such as those shown in FIGS. 2 through 12. Alternatively, indicia can be provided using other suitable methods such as silk-screening, pad printing, optical fibers, etc.

Alternatively, or additionally, the light-transmissive portion 116 may be defined by one or more openings or holes through the popsicle stick 104. The holes can be arranged to form the indicia 120. Accordingly, light 124 from the light source 112 can pass through the holes and becomes visible external to the popsicle stick 104. The visible light passing through the holes will thus appear in the form of the indicia 120.

Portions of the popsicle stick 104 adjacent the light-transmissive portion 116 may have means for inhibiting light from inadvertently escaping out of those portions of the popsicle stick 104. For example, portions of the popsicle stick 104 may be substantially opaque, reflective, faceted, etc. in order to help direct light through the popsicle stick 104 and/or towards the indicia 120. Additionally, or alternatively, the popsicle stick 104 can be configured (e.g., shaped, sized, and formed of suitable materials, etc.) so that the popsicle stick 104 functions to guide or conduct at least some of the light 124 through the interior of the popsicle stick 104, for example, by successive internal reflections. Accordingly, the selection of material(s) for the popsicle stick 104 can depend at least in part on the material's ability to channel or transmit light 124 from the light source 112 through the popsicle stick 104 and/or the material's ability to at least reduce the amount of light that inadvertently escapes out of the popsicle stick 104. In these exemplary manners (which can also be applied to other embodiments of the invention including the embodiments shown in FIGS. 2 through 12), at least some light 124 from the light source 112 can remain within the popsicle stick 104 at least until the light 124 reaches the indicia 120. This, in turn, can increase the amount of available light for highlighting the indicia 120 and/or edible 108.

A wide range of materials, preferably light-weight and chemically non-reactive to the edible 108, can be used for the popsicle stick 104 and its light-transmissive portion 116. Further, the same materials do not have to be used for the light-transmissive portion 116 and the other popsicle stick portions. Exemplary materials that can be used for the lighted popsicle stick include transparent materials, translucent materials, other light-altering materials (e.g., materials that alter light by refraction, diffraction, diffusion, and/or dispersion), flexible materials, plastic materials, vinyl materials, polystyrene, polyvinylchloride (PVC) (e.g., environmentally PVC, medical grade PVC, etc.) and materials capable of being mass produced with relatively low manufacturing costs, among other materials suitable for the intended purpose. The type of material used for the light-transmissive portion 116 may depend at least in part on the particular type and intensity of light produced by the light source. In addition, various manufacturing processes can be used for forming the popsicle stick, including injection molding and casting (e.g., casting poly resin, casting acrylic, etc.).

Optionally, the edible 108, or at least a portion thereof, can also be light-transmissive. In the illustrated embodiment of FIG. 1, the light source 112 directs light 124 generally upwardly through the popsicle stick 104. At least a portion 124' of the light 124 travels through the popsicle stick 104 out its end 128 and into the edible 108. In this exemplary manner, light 124' from the light source 112 can illuminate the edible 108, or at least a portion thereof.

Popsicles and other ice confections can be colored consistent with their flavoring. For example, a lime-flavored ice confection can be green in color, a banana-flavored ice confection can be yellow, a grape-flavored ice confection can be purple, and so on. Therefore, when light radiates through the popsicle stick 104 and into the edible 108, the light also radiates through the edible 108 to create a colorful glow.

In other embodiments, however, the edible can be generally clear or transparent. To produce a colorful glow consistent with the edible's flavor, the light source may produce light having a particular color and/or produce broadband light that travels through a colored filter within the popsicle stick. In yet other embodiments, the edible, or at least a portion thereof, can be ultraviolet-reactive (e.g., include an ultraviolet-reactive food additive, etc.), and the light source can produce ultraviolet light for illuminating the ultraviolet-reactive edible. For example, the edible, or at least a portion thereof, can be responsive to the ultraviolet A (UVA) radiation component of black light produced by the light source, which, in turn, produces a visually stimulating effect.

While not shown in FIG. 1, the edible 108 can also define one or more indicia, which are the same as or different than the indicia 120 defined by the popsicle stick 104. For example, the lollypop stick 204 and candy piece 208 in FIG. 2 both define indicia 220 and 220', respectively, which are highlighted by light 224, 224' from the light source 212.

With further reference to FIG. 1, the light source 112 includes a single LED coupled to the popsicle stick 104. Alternatively, other quantities of LEDs and/or other suitable light sources can be employed such as incandescent, laser, fluorescent, phosphorescent, chemiluminescent, halogen, fiber optics, electroluminescent, neon light sources, ultraviolet lights, black lights, and the like.

In the illustrated embodiment, the light source 112 is disposed entirely within the popsicle stick 104 adjacent an end portion 132 of the popsicle stick 104. Alternatively, the light source 112 need not be positioned entirely within the popsicle stick 104. Instead, the light source 112 may be partially or entirely disposed external to the popsicle stick 104. The light source 112 can also be disposed at other locations within the popsicle stick 104 besides the end portion 132.

The lighted item 100 also includes a power source compartment or receptacle 136 defined within the end portion 132 of the popsicle stick 104. The power source receptacle 136 is adapted to receive at least one power source 140 therein and to electrically connect the power source 140 to the light source 112 via conductive leads 144. Alternatively, the power source 140 need not be positioned entirely within the popsicle stick 104. Instead, the power source 140 may be partially or entirely disposed external to the popsicle stick 104. The power source compartment 136 can reside elsewhere, such as at other locations within the popsicle stick 104.

In FIG. 1, the power source 140 is a single watch battery, although other suitable types and numbers of power sources can be used depending on the particular application. The power source 140 can include any suitable means of providing energy to the light source 112 such as renewable batteries, rechargeable batteries, disposable batteries, power cells, solar cells, watch batteries, and other suitable power sources, including kinetic power sources. If rechargeable, such power source 140 could be rechargeable by solar, magnetic, electrical, and chemical means, and the like or any combination thereof.

To allow a user internal access to the power source compartment 136, for example, to install, replace, or remove batteries, the power source container 136 may include a removable portion. The removable portion may be engaged with the power source compartment 136 using a suitable fastening system or method (e.g., a threaded connection, an interference fit, resilient ribs, among others).

In the illustrated embodiment, the lighted popsicle stick 104 includes a push-button switch 148 for switchably connecting the light source 112 to the power source 140, although other switching means can also be employed. The switch 148 is positioned within the popsicle stick 104 and is coupled to an externally flexible surface portion 152 of the stick 104 such that application of external pressure upon the externally flexible surface portion 152 activates the switch 148 thereby causing operation of the light source 112. The external pressure may, for example, be applied by the user squeezing the stick 104 at the externally flexible surface portion 152. The switch 148 may also allow the user to cycle through the various display modes or select a particular color of light to be emitted by the light source 112 by successively squeezing the stick 104 at about the externally flexible surface portion 152. Additionally, the switch 148 may also allow the user to dim or brighten the intensity of the light, for example, by holding down the switch 148 with continuously applied pressure to the lollypop stick 104 at about the externally flexible surface portion 152. This exemplary means for switchably connecting the light source 112 to the power source 140 can also be applied to other embodiments of the invention such as those shown in FIGS. 2 through 12.

In another embodiment, the switching means can include electrical terminals located externally on the popsicle stick 104 (e.g., at about portion 152, etc.) such that the user's hand, upon grasping the stick 104, electrically connects the terminals to one another, thus completing a circuit for power delivery from the power source 140 to the light source 112.

In various embodiments, the light source 112, power source 140, switch 148, and/or conductors 144 can be encapsulated by the material forming the popsicle stick 104 in a fluid-tight fashion. This, in turn, can help prevent liquid (e.g., the iced-confection after it begins to melt, a user's perspiration, rain, etc.) from contacting (and potentially causing problems with the operation of) the various components encapsulated within the popsicle stick 104. In addition, this encapsulation can also at least help support and retain the positioning of the light source 112, power source 140, switch 148, and/or conductors 144. Further, this exemplary means for encapsulating the light source 112, power source 140, switch 148, and/or conductors 144 can also be applied to other embodiments of the invention such as the embodiments shown in FIGS. 2 through 12. In one exemplary embodiment, this encapsulation can be accomplished by applying a substantially liquid resin (e.g., a food grade liquid resin) over the light source 112, power source 140, switch 148, and/or conductors 144, and then allowing the resin to solidify.

In various embodiments, the inside of the popsicle stick 104 can be generally hollow such that a cavity is defined therein. Alternatively, the popsicle stick 104 can be substantially solid.

FIG. 2 illustrates a lighted lollypop 200 embodying several aspects of the invention. As shown in FIG. 2, the lighted lollypop 200 includes a lollypop stick 204 and a confection, such as a piece of candy 208. The candy piece 208 is coupled to the lollypop stick 204. At least one light source 212 is also coupled to the lollypop stick 204. The lighted lollypop stick 204 can be disposable or reusable, as can other embodiments of the invention including the embodiments shown in FIGS. 1 and 3-12.

The lollypop stick 204 and the candy piece 208 can both include light-transmissive portions 216 and 216' which respectively define indicia 220 and 220'. In the illustrated embodiment, the lollypop stick's light-transmissive portion 216 defines indicia 220 as "RAMS", which can be highlighted by light 224 from the light source 212. The candy piece 208 defines indicia 220' resembling a football helmet. Alternatively, other suitable indicia can be defined (e.g., etched into, etc.) by the light-transmissive portions 216 and 216'.

When connected to the power source 240, the light source 212 directs light 224 generally through the lollypop stick 204. At least a portion 224' of the light 224 travels through the lollypop stick 204 out its end portion 228 and into the candy piece 208. In this exemplary manner, light 124' from the light source 112 can illuminate the candy piece 208 and the indicia 220' defined thereby.

Portions of the lollypop stick 204 adjacent the light-transmissive portion 216 may have means for inhibiting light from inadvertently escaping out of those portions of the lollypop stick 204. For example, portions of the lollypop stick 204 may be substantially opaque, reflective, faceted, etc. in order to help direct light through the lollypop stick 204 and/or towards the indicia 220. Additionally, or alternatively, the lollypop stick 204 can be configured (e.g., shaped, sized, and formed of suitable materials, etc.) so that the lollypop stick 204 functions to guide or conduct at least some of the light 224 through the interior of the stick 204, for example, by successive internal reflections. Accordingly, the selection of material(s) for the lollypop stick 204 can depend at least in part on the material's ability to channel or transmit light 224 from the light source 212 through the stick 204 and/or the material's ability to at least reduce the amount of light that inadvertently escapes out of the lollypop stick 204. In this exemplary manner, at least some light 224 from the light source 212 can remain within the lollypop stick 204 at least until the light 224 reaches the indicia 220. This, in turn, can increase the amount of available light for highlighting the indicia 220 and/or the candy piece 208, thereby enhancing the illumination or highlighting effect.

A wide range of materials, preferably light-weight and chemically non-reactive to the candy piece 208, can be used for the lollypop stick 204 and its light-transmissive portion 216. Further, the same materials do not have to be used for the light-transmissive portion 216 and the other lollypop stick portions. Exemplary materials that can be used for the lollypop stick 204 include transparent materials, translucent materials, other light-altering materials (e.g., materials that alter light by refraction, diffraction, diffusion, and/or dispersion), flexible materials, plastic materials, vinyl materials, polystyrene, polyvinylchloride (PVC) (e.g., environmentally PVC, medical grade PVC, etc.) and materials capable of being mass produced with relatively low manufacturing costs, among other materials suitable for the intended purpose. The type of material used for the lollypop stick 204 may depend at least in part on the particular type and intensity of light produced by the light source. In addition, various manufacturing processes can be used for forming the lollypop stick, including injection molding and casting (e.g., casting poly resin or acrylic).

Because the candy piece 208 can also be colored consistent with its flavoring (e.g., an orange-flavored candy piece can be orange in color, etc.), the light 224' radiating through the edible 208 can create a colorful glow. The candy piece 208, however, can also be transparent and/or be ultraviolet-reactive (e.g., responsive to the UVA radiation component of black light). To provide and/or enhance a colorful glow consistent with the candy piece's flavor, the light source may produce light having a particular color and/or produce broadband light that travels through a colored filter within the lollypop stick. This exemplary means for producing thematic light can be applied to other embodiments of the invention including the embodiments shown in FIGS. 1 through 12.

In the illustrated embodiment, the light source 212 is disposed entirely within the lollypop stick 204 adjacent an end portion 232 of the lollypop stick 204. Alternatively, the light source 212 need not be positioned entirely within the lollypop stick 204. Instead, the light source 212 may be partially or entirely positioned external to the lollypop stick 204. The light source 212 can also be positioned at other locations within the lollypop stick 204 besides the end portion 232.

The lighted item 200 can also include a power source compartment or receptacle 236 within the end portion 232 of the lollypop stick 204. The power source receptacle 236 is adapted to receive at least one power source 240 therein and to electrically connect the power source 240 to the light source 212 via conductive leads 244. Alternatively, the power source compartment 236 can reside elsewhere, such as at other locations external to or within the lollypop stick 204.

In the illustrated embodiment, the lighted lollypop 200 includes a push-button switch 248 for switchably connecting the light source 212 to the power source 240, although other switching means can also be employed. The switch 248 is positioned within the lollypop stick 204 and is coupled to an externally flexible surface portion 252 of the lollypop stick 204 such that application of external pressure upon the externally flexible surface portion 252 activates the switch 248 thereby causing operation of the light source 212. The external pressure may, for example, be applied by the user squeezing the lollypop stick 204 at the externally flexible surface portion 252. The switch 248 may also allow the user to cycle through the various display modes or select a particular color of light to be emitted by the light source 212 by successively squeezing the lollypop stick 204 at about the externally flexible surface portion 252. Additionally, the switch 248 may also allow the user to dim or brighten the intensity of the light, for example, by holding down the switch 248 with continuously applied pressure to the lollypop stick 204 at about the externally flexible surface portion 252.

FIG. 3 illustrates a lighted cup 300 which embodies several aspects of the invention. As shown in FIG. 3, the lighted cup 300 is generally cone-shaped and can be used as a snow cone cup. As with other embodiments of the invention, the lighted cup 300 can be disposable or reusable. Alternatively, the lighted cup 300 can include other suitable shapes, such as a coffee mug, beverage cup or glass, wine glass, etc.

The lighted cup 300 includes a light-transmissive portion 316 defining one or more indicia 320. In the exemplary embodiment, the indicia 320 resemble a mouse's head, although other indicia can also be employed.

The lighted cup 300 also includes at least one light source 312, such as one or more LEDs or other suitable light source. The light source 312 is switchably connectable to at least one power source 340 (e.g., a watch battery, etc.) received within a power source compartment 336 defined by the lighted cup 300.

When connected to the power source 340, the light source 312 emits light 324 which highlights the indicia 320. Light 324 from the light source 312 can be guided or conducted by the cup's sidewalls 360 such that the light travels generally between the inner and outer surfaces 364 and 368 of the cup's sidewalls 360 and into the flavored ice or snow portion 308. In this exemplary manner, the flavored ice, or at least a portion thereof, can be illuminated by light 324' from the light source 312.

Portions of the cup's sidewalls 360 adjacent the light-transmissive portion 316 may have means for inhibiting light from inadvertently escaping out of those portions of the CUD'S sidewalls 360. For example, portions of the CUD'S sidewalls 360 may be substantially opaque, reflective, faceted, etc. in order to help guide light 324 generally upwardly between the inner and outer surfaces 364 and 368 of the cup's sidewalls 360 and/or towards the indicia 320. Additionally, or alternatively, the cup's sidewalls 360 can be configured (e.g., shaped, sized, and formed of suitable materials, etc.) so that the cup's sidewalls 360 functions to guide or conduct at least some of the light 324 generally between the inner and outer surfaces 364 and 368 of the cup's sidewalls 360, for example, by successive internal reflections. Accordingly, the selection of material(s) for the cup's sidewalls 360 can depend at least in part on the material's ability to channel or transmit light 324 from the light source 312 generally between the inner and outer surfaces 364 and 368 of the cup's sidewalls 360 and/to its ability to at least reduce the amount of light that inadvertently escapes inwardly or externally from within the cup's sidewalls 360. This, in turn, can increase the amount of available light for highlighting the indicia 320 and/or flavored snow 308, thereby enhancing the illumination or highlighting effect.

A wide range of materials, preferably light-weight and chemically non-reactive to the edible 308, can be used for the cup's sidewalls 360 and its light-transmissive portion 316. Further, the same materials do not have to be used for the light-transmissive portion 316 and the other popsicle stick portions. Exemplary materials that can be used for the cup 300 include transparent materials, translucent materials, other light-altering materials (e.g., materials that alter light by refraction, diffraction, diffusion, and/or dispersion), flexible materials, plastic materials, vinyl materials, polystyrene, polyvinylchloride (PVC) (e.g., environmentally PVC, medical grade PVC, etc.) and materials capable of being mass produced with relatively low manufacturing costs, among other materials suitable for the intended purpose. The type of material used for the cup 300 and light-transmissive portion 316 may depend at least in part on the particular type and intensity of light produced by the light source. In addition, various manufacturing processes can be used for forming the cup 300, including injection molding and casting (e.g., casting poly resin or acrylic).

The snow cone cup 300 can also include an externally flexible surface portion 352, and at least one switching device 348 (e.g., a push button switch, among other suitable switching means, etc.) coupled to the externally flexible surface portion 352 such that application of external pressure upon the externally flexible surface portion 352 activates the switching device 348. Activation of the switching device 348 connects the light source 312 to the power source 340.

In other embodiments, the snow cone cup 300 can include electrical terminals for switchably connecting the light source 312 to the power source 340. For example, the electrical terminals can be located within the snow cone cup 300 such that flavored ice or liquid (after ice has melted) within the snow cone cup 300 causes electrical contact between the terminals to complete the circuit for power delivery to the light source 312 from the power source 340. In a preferred implementation, the terminals are located within the snow cone cup 300 at a bottom portion thereof. In this exemplary manner, the electrical terminals can be electrically connected to one another by the flavored ice or liquid until all (or at least substantially all) of the flavored ice or liquid has been removed (e.g., consumed by the user or dumped out) from the snow cone cup 300. Or for example, the electrical terminals can be located externally on the snow cone cup 300 such that the user's hand, upon grasping the snow cone cup 300, electrically connects the terminals to one another, thus completing the circuit for power delivery to the light source 312 from the power source 340. The exemplary means for switchably connecting the light source 312 to the power source 340 described above can also be applied to other embodiments of the invention such as those shown in FIGS. 1 through 12.

FIG. 4 illustrates a lighted cotton candy holder 400 which embodies several aspects of the invention. As shown in FIG. 4, the lighted cotton candy holder 400 is generally cone-shaped and can be used to receive and retain cotton candy 408. As with other embodiments of the invention, the lighted cotton candy holder can be disposable or reusable. Alternatively, other suitable shapes can be employed for the lighted cotton candy holder.

The lighted cotton candy holder 400 includes a light-transmissive portion 416 defining one or more indicia 420 (e.g., "WALT DISNEY WORLD"® theme Dark, etc.). For example, indicia 420 can be etched or carved into the holder 400.

The lighted cotton candy holder 400 also includes at least one light source 412, such as one or more LEDs and/or other suitable light sources. The light source 412 is switchably connectable with at least one power source 440 (e.g., a watch battery, etc.) within a power source compartment 436 defined by the lighted cotton candy holder 400.

When connected to the power source 440, the light source 412 emits light 424 which highlights the indicia 420. Light 424' from the light source 412 also passes through the cotton candy holder 400, out an end 428 thereof, and into the cotton candy 408. Because the cotton candy 408 is porous, light 424' radiating from within the cotton candy 408 causes the cotton candy 408 to emanate a colorful glow. In this exemplary manner, the cotton candy 408, or at least a portion thereof, can be illuminated with light 424' from the light source 412.

The cotton candy holder 400 may have means for inhibiting light from inadvertently escaping out of the cotton candy holder 400. For example, the cotton candy holder 400 can be configured (e.g., shaped, sized, have opaque portions, formed of suitable materials, etc.) so as to at least help direct light through the holder 400 and/or towards the indicia 420 and/or to at least reduce the amount of light escaping from the holder 400. In this exemplary manner, the amount of light available for highlighting the indicia 420 and/or the cotton candy 408 can be increased, thereby enhancing the illumination or highlighting effect.

The indicia 420 can be formed at a sufficient depth into the holder 400 and/or at an acute angle relative to the direction of travel of the light 424 so as to increase the light transmissibility of the indicia 420 and/or allow the indicia 420 to alter (e.g., capture, refract, disperse, diffuse, diffract, etc.) light traveling within the holder 400. Etching the indicia 420 can affect the way that the light 424 interacts with the etched indicia 420. For example, with relative deeply carved or etched indicia, the light 424 can be captured in the edges of the indicia 420, which, in turn, highlights the indicia 420 relative to its surrounding environment.

In some embodiments, the cotton candy holder can also include an externally flexible surface portion and at least one switching device coupled to the externally flexible surface portion such that application of external pressure upon the externally flexible surface portion activates the switching device. This, in turn, electrically connects the light source 412 to the power source 440. Alternatively, other switching means can be employed for the cotton candy holder.

FIG. 5 illustrates a lighted candy ring pop 500 that embodies several aspects of the invention. As shown in FIG. 5, the lighted candy ring pop 500 includes a base portion 504 and a ring or annular portion 506 for placing the candy ring pop 500 on a user's finger. The lighted candy ring pop 500 also includes a piece of candy 508 coupled to the base portion 504.

At least one of the base portion 504 and the candy piece 508 define one or more indicia. In the illustrated embodiment, the candy piece 508 is light-transmissive and defines one or more indicia 520 (e.g., "SEAN", etc.)

The lighted candy ring pop 500 also includes at least one light source 512, such as one or more LEDs and/or other suitable light sources. The light source 512 is switchably connectable with at least one power source 540 (e.g., a watch battery, etc.) within a power source compartment 536 defined by the lighted candy ring pop 500.

When connected to the power source 540, the light source 512 emits light 524 which highlights the indicia 520. Light 524' from the light source 512 also passes through and illuminates the candy piece 508, or at least a portion thereof. Because the candy piece 508 can be colored consistent with its flavoring (e.g., a cherry-flavored candy piece can be red, etc.), light 524' radiating through the edible 508 can create a colorful glow. Additionally, or alternatively, the light source may produce light having a particular color and/or produce broadband light that travels through a colored filter to create or further enhance the colorful glow.

The base portion 504 can be disposable or reusable. The indicia 520 can be formed at a sufficient depth and/or acute angle relative to direction of travel of the light 524 so as to increase the light transmissibility of the indicia 520 and/or allow the indicia to alter (e.g., capture, refract, disperse, diffuse, diffract, etc.) light 524. This, in turn, can enhance the illuminating or highlighting effect imparted to the indicia 520 by light 524.

FIG. 6 illustrates a lighted pacifier 600 that embodies several aspects of the invention. As shown in FIG. 6, the lighted pacifier 600 includes a base portion 604 and a portion 606 adapted to be readily grasped or coupled to a baby's finger. The lighted pacifier 600 also includes a nipple 608 coupled to the base portion 604.

At least one of the base portion 604 and the nipple 608 define one or more indicia. In the illustrated embodiment, the nipple 608 is light-transmissive and defines one or more indicia 620.

The lighted pacifier 600 also includes at least one light source 612, such as one or more LEDs or other suitable light source. The light source 612 is switchably connectable with at least one power source 640 within a power source compartment 636 defined by the lighted pacifier 600.

When connected to the power source 640, the light source 612 emits light 624 which highlights the indicia 620. Light from the light source 612 also passes through and illuminates the nipple 608, or at least a portion thereof.

The indicia 620 can be formed at a sufficient depth into the nipple 608 and/or at an acute angle relative to a direction of travel of the light 624 so as to increase the light transmissibility and/or accentuation of the indicia 624 and/or allow the indicia 620 to alter (e.g., capture, refract, disperse, diffuse, diffract, etc.) light 624.

The nipple 608 may have means for inhibiting light from inadvertently escaping out of the nipple 608. For example, the nipple 608 can be configured (e.g., shaped, sized, have opaque portions, formed of suitable materials, etc.) so as to at least help direct light through the nipple 608 and/or towards the indicia 620. In this exemplary manner, the amount of light available for highlighting the indicia 620 can be increased.

Figure 7A:
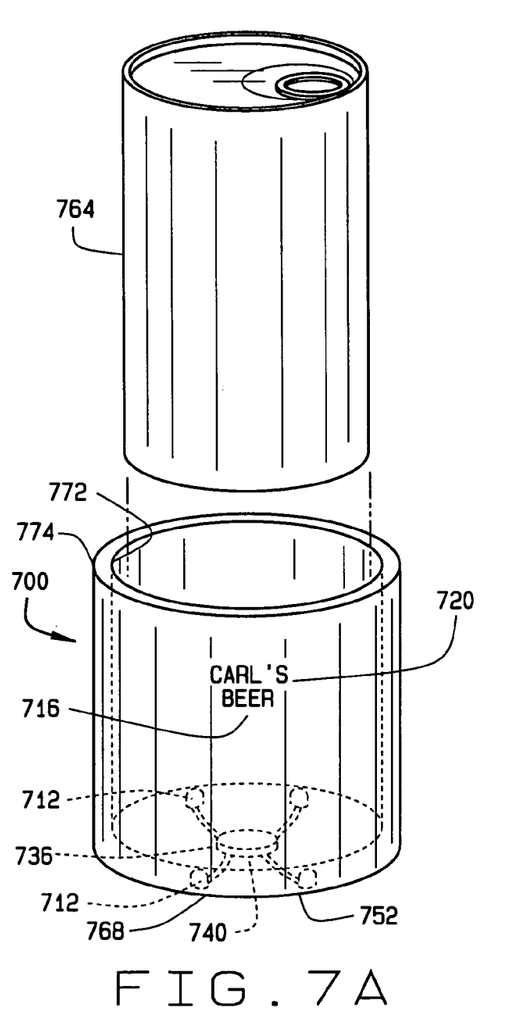
FIGS. 7A and 7B are perspective views of a lighted receptacle for a beverage container according to another embodiment of the invention.
Figure 7B:
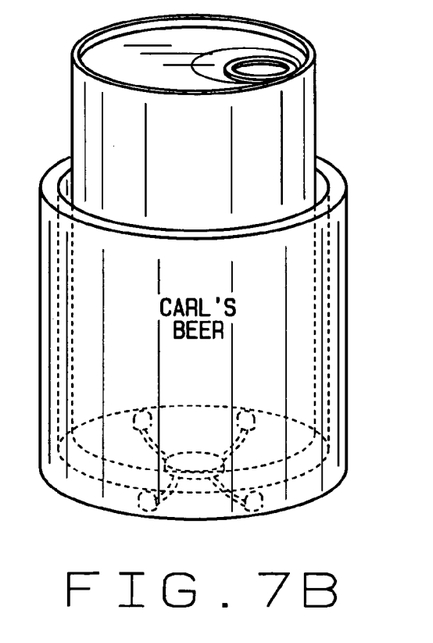

FIGS. 7A and 7B illustrate a lighted receptacle 700 embodying several aspects of the invention. The lighted receptacle 700 is sized to receive a beverage container, such as a beer can 764, beer bottle, a beverage glass, cup, etc. At least a portion 716 of the lighted receptacle 700 is light-transmissive and defines one or more indicia 720 (e.g., "CARL'S BEER").

The indicia 720 can be positioned so as to accentuate certain portions of the beverage container. For example, the indicia 720 can be positioned to accentuate or draw attention to the brewery name or brand of beer on a preexisting label attached to the beer can 764. In this exemplary manner, the lighted receptacle 700 and highlighted indicia 720 can serve an advertising purpose for the brewery name or brand of beer.

As shown, the lighted receptacle 700 includes four LEDs 712, although other quantities of LEDs and/or other suitable light source types can be employed. The LEDs 712 are switchably connectable with at least one power source 740 (e.g., a watch battery, etc.) within a power source compartment 736 defined by a bottom portion 768 of the lighted receptacle 700. Alternatively, the power source compartment 736 can be defined by other portions of the lighted receptacle.

When connected to the power source 740, the LEDs 712 emit light which highlights the indicia 720. Light from the LEDs 712 can be guided or conducted by the receptacle sidewalls 772 and 774 such that the light travels generally upwardly between the sidewalls 772 and 774. The indicia 720 can be formed at a sufficient depth into the receptacle 700 and/or at an angle relative to a direction of travel of the light so as to increase the light transmissibility and/or accentuation of the indicia 720 and/or to allow indicia 720 to alter (e.g., capture, refract, disperse, diffuse, diffract, etc.) light from the LEDs 712.

Portions of the sidewalls 772 and 774 adjacent the light-transmissive portion 716 may have means for inhibiting light from inadvertently escaping out of those portions of the sidewalls 772 and 774. For example, portions of the sidewalls 772 and 774 may be substantially opaque, reflective, faceted, etc. in order to help guide light generally upwardly between the sidewalls 772 and 774 and/or towards the indicia 720. Additionally, or alternatively, the sidewalls 772 and 774 can be configured (e.g., shaped, sized, and formed of suitable materials, etc.) so that the sidewalls 772 and 774 cooperate to guide or conduct light generally between the sidewalls 772 and 774, for example, by successive internal reflections. Accordingly, the selection of material(s) for the receptacle 700 and its sidewalls 772 and 774 can depend at least in part on the material's ability to channel or transmit light from the LEDS 712 generally between the sidewalls 772 and 774 and/or the material's ability to at least reduce the amount of light that inadvertently escapes from within the sidewalls 772 and 774. This, in turn, can increase the amount of available light for highlighting the indicia 720.

A wide range of materials, preferably light-weight and thermally-insulating (for example, to help keep a beverage cool while it is being consumed) can be used for the receptacle 700. Further, the same materials do not have to be used for the light-transmissive portion 716 and the other receptacle portions. Exemplary materials that can be used for the receptacle 700 include transparent materials, translucent materials, other light-altering materials (e.g., materials that alter light by refraction, diffraction, diffusion, and/or dispersion), flexible materials, plastic materials, vinyl materials, polystyrene, polyvinylchloride (PVC) (e.g., environmentally PVC, medical grade PVC, etc.) and materials capable of being mass produced with relatively low manufacturing costs, among other materials suitable for the intended purpose. The type of material used for the receptacle 700 may depend at least in part on the particular type and intensity of light produced by the light source.

In some embodiments, light from the LEDs 712 can also pass through the receptacle 700 into a transparent or translucent beverage container within the receptacle 700. In this exemplary manner, the beverage within the beverage container can be illuminated with light emitted by the LEDs 712.

The lighted receptacle 700 can also include an externally flexible surface portion 752, such as a flexible bottom portion, and at least one switching device coupled to the externally flexible surface portion 752. Application of external pressure upon the externally flexible surface portion activates the switching device and switchably connects the light sources 712 to the power source 740.

Optionally, one or more of the various LEDs 712 may produce light that has at least one attribute (e.g., color, intensity, blink speed, hue, saturation, brightness, etc.) different than the light produced by the other LEDs 712. By way of example, one or more LEDs 712 may produce blue-colored light, whereas the other LEDs 712 may produce red-colored light, among other colors and color combinations. Rather than producing colored light, one or more of the LEDs 712 can produce broadband light that travels through a colored filter, which may but need not be the light-transmissive portion 716.

The receptacle 700 can also define a cavity therein. For example, a cavity may be defined between the inner walls 772 and outer walls 774 of the receptacle 700. Filler may be disposed within the cavity. This filler can be adapted to retain heat when the receptacle is heated and/or retain cold when the receptacle is cooled. Exemplary fillers include commercially available materials bearing cold-retaining and/or heat-retaining properties such as, but not limited to, materials generally used in re-usable ice-packs, re-usable heating pads, hot/cold gel packs, single-use hand and toe warmers, among other suitable known (and presently unknown) materials.

Additionally, light-altering particles (e.g., glitter, reflective particles, refractive particles, translucent particles, glass-like prisms, colored particles, clear particles, etc.) may be disposed within the cavity defined by the receptacle 700, with or without the filler. For example, light-altering particles may be suspended within a hot/cold gel or other suitable substance within the cavity. Or, for example, light-altering particles may be contained within a separate container (e.g., tube having etched sidewalls, etc.), which, in turn, is suspended by a filler within the cavity. The light-altering particles can receive and alter light from a light source to create a visibly pleasing or sparkling light effect. Light-altering particles can also be used with other embodiments of the invention including the embodiments shown in FIGS. 1-6 and 8-12).

Figure 8A:
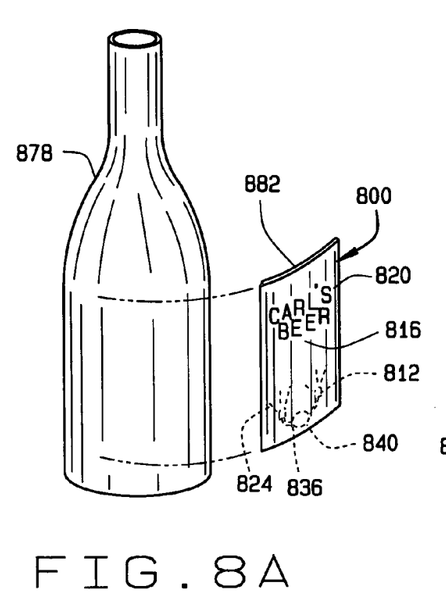
FIGS. 8A and 8B are perspective views of a lighted label according to another embodiment of the invention.
Figure 8B:
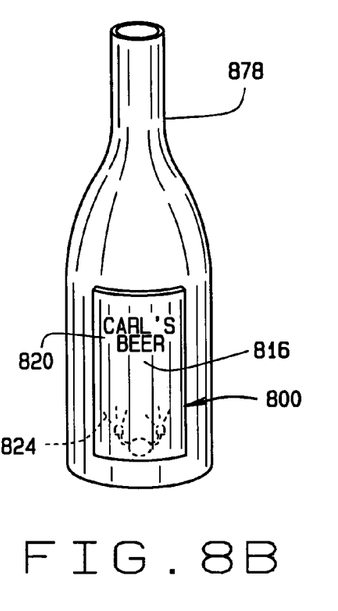

FIGS. 8A and 8B illustrate a lighted label 800 embodying several aspects of the invention. The lighted label 800 is adapted to be coupled to a beverage container, such as a beer bottle 878. In an exemplary embodiment, a back surface 882 of the label 800 has an adhesive thereon which is suitable for attaching the label 800 to a glass bottle, although other suitable attachment means can also be employed. The light label 800 can be disposable or reusable.

At least a portion 816 of the lighted label 800 is light-transmissive and defines one or more indicia 820. For example, the indicia 820 may include a person's name (e.g., "CARL'S BEER") to allow that person's drink to be readily identified, for example, from a group of other drinks on a table. The indicia 820 can also be positioned so as to accentuate certain portions of the beverage container. For example, the indicia 820 can be positioned to accentuate or draw attention to the brewery name or brand of beer on a preexisting label attached to the beer bottle 878. In this exemplary manner, the lighted label 800 and highlighted indicia 820 can serve an advertising purpose for the brewery name or brand of beer.

As shown, the lighted label 800 includes two LEDs 812, although other quantities of LEDs and/or other suitable light source types can be employed. The LEDs 812 are switchably connectable with at least one power source 840 (e.g., a watch battery, etc.) within a power source compartment 836 defined by the lighted label 800.

When connected to the power source 840, the LEDs 812 emit light 824 which highlights the indicia 820. The indicia 820 can be formed at a sufficient depth into the label 800 and/or at an angle relative to a direction of travel of the light 824 so as to increase the light transmissibility or accentuation of the indicia 820 and/or to allow the indicia 820 to alter (e.g., capture, refract, disperse, diffuse, diffract, etc.) light 824.

The label 800 may have means for inhibiting light from inadvertently escaping out of the label 800. For example, the label 800 can be configured (e.g., shaped, sized, have opaque portions, formed of suitable materials, etc.) so as to at least help direct light through the label 800 and/or towards the indicia 820. In this exemplary manner, the amount of light available for highlighting the indicia 820 can be increased.

In some embodiments, the back portion 882 of the label 800 is transparent or translucent such that light 824 from the LEDs 812 can pass into a transparent or translucent beverage container to which the label 800 is attached. In this exemplary manner, the beverage within the beverage container can also be illuminated with light emitted by the LEDs 812.

The lighted label 800 can also include an externally flexible surface portion, for example a flexible back portion 882, and at least one switching device coupled to the externally flexible surface portion. Application of external pressure upon the externally flexible surface portion activates the switching device. This, in turn, electrically connects the LEDs 812 to the power source 840. Alternatively, other switching means can also be employed for the lighted label 800.

Optionally, one or more of the various LEDs 812 may produce light that has at least one attribute (e.g., color, intensity, blink speed, hue, saturation, brightness, etc.) different than the light produced by the other LEDs 812. By way of example, one or more LEDs 812 may produce blue-colored light, whereas the other LEDs 812 may produce red-colored light, among other colors and color combinations. Rather than producing colored light, one or more of the LEDs 812 could produce broadband light that travels through a colored filter, which may but need not be the light-transmissive portion 816.

In some embodiments, the label's back portion 882 (or other label portion) may include a graphic element or image (e.g., a scene, printed material, a photograph, artwork, an art print, a photographic print, etc.) which may but need not be ultraviolet-reactive (e.g., responsive to the ultraviolet A (UVA) radiation component of black light). The indicia 820 can be positioned relative to the graphic element to accentuate certain portions of the graphic element when the indicia 820 are highlighted. Further, some embodiments include indicia 820 formed with ultraviolet-reactive ink (e.g., ink responsive to the UVA component of black light) and/or an ultraviolet-reactive light-transmissive portion 816. In which case, the light source 812 is preferably adapted to produce and direct ultraviolet light (e.g., black light which includes a UVA radiation component) at the indicia 820, light-transmissive portion 816, and the graphic element.

Figure 9:
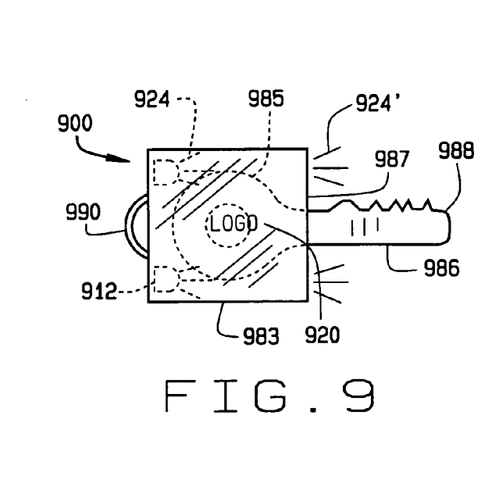
FIG. 9 is a side elevation view of a lighted key holder according to another embodiment of the invention.
Figure 10:
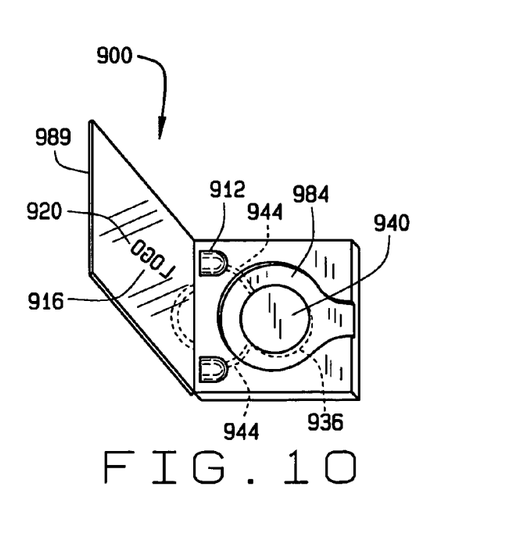
FIG. 10 is a perspective view of the lighted key holder in FIG. 9.

FIGS. 9 and 10 illustrate a lighted key holder 900 embodying several aspects of the invention. As shown, the lighted key holder 900 includes a housing 983 which defines an internal compartment 984 adapted to receive a back portion 985 of a key 986. At least a portion 916 of the housing 983 is light-transmissive and defines one or more indicia 920.

In an exemplary embodiment, the indicia 920 is etched or carved (e.g., with a cutting tool, knife, razor blade, laser, chemically etched, drilled, etc.) into the material (e.g., plastic, etc.) forming the key holder 900. This etching can increase the light transmissibility of the etched indicia and/or allow the etched indicia to alter (e.g., capture, refract, disperse, diffuse, diffract, etc.) light 924. The preferred angle(s) and depth at which the indicia is cut into the key holder material will depend on the particular application. In exemplary embodiments, the indicia can be etched into an outer and/or inner surface of the key holder material at an angle of about +/−45 degrees relative to the direction of travel of the light 924.

As shown, the lighted key holder 900 includes two LEDs 912, although other quantities of LEDs and/or other suitable light source types can be employed. The LEDs 912 are switchably connectable via conductive leads 944 with at least one power source 940 (e.g., a watch battery, etc.) within a power source compartment 936 defined by the lighted key holder 900.

When connected to the power source 940, the LEDs 912 emit light 924 which highlights the indicia 920. The light 924 can be guided or conducted by the housing 983 such that the light travels generally towards the indicia 920 and/or a front portion 987 of the housing 983. In at least some embodiments, the front portion 987 is transparent (or at least translucent) such that light 924' can pass therethrough. In this exemplary manner, a key portion 988 extending outwardly from the housing 983 (and a keyhole adjacent thereto) can be illuminated with light 924' emitted by the LEDs 912.

The key holder 900 may have means for inhibiting light from inadvertently escaping out of the label 800. For example, the key holder 900 can be configured (e.g., shaped, sized, have opaque portions, formed of suitable materials, etc.) so as to at least help direct light 924 generally towards the front portion 987 and/or the indicia 920. This, in turn, can increase the amount of available light for highlighting the indicia 920 and/or for illuminating the key portion 988.

The housing 983 can include an externally flexible surface portion and at least one switching device (e.g., push-button switching device, etc.) coupled to the externally flexible surface portion such that application of external pressure upon the externally flexible surface portion activates the switching device. This, in turn, switchably connects the LEDs 912 to the power source 940. Alternatively, other switching means can also be employed. For example, in another embodiment, the key holder includes electrical terminals external to the housing such that a user's hand upon grasping the key holder causes electrical contact between the terminals thus completing the circuit for power delivery to the light source from the power source.

To allow a user internal access to the key compartment 984, for example, to remove or replace the key 986, the key holder 900 includes an openable portion 989, such as a lid or cap. When in the open position (FIG. 10), the portion 989 exposes the key compartment 984. But the portion 989 closes the key compartment 984 to retain the key 986 within the housing 983 when the portion 989 is coupled to the housing 983 in a closed position (FIG. 9).

In the illustrated embodiment of FIGS. 9 and 10, the portion 989 is pivotably or hingedly coupled to the housing 983 such that the portion 989 is pivotal between an opened position (FIG. 10) and a closed position (FIG. 9). Alternatively, the portion 989 can be removably coupled to the housing 983 by using a suitable fastening system or method (e.g., a threaded connection, an interference fit, resilient ribs, among others).

The lighted key holder 900 can also include a loop 990 for attaching the lighted key holder 900 to a key ring or key chain. Alternatively, other attachment devices (e.g., magnets, clasps, hook and loop fasteners, etc.) can also be used for attaching the key holder 900 to a key ring, key chain, or a user.

Figure 11:
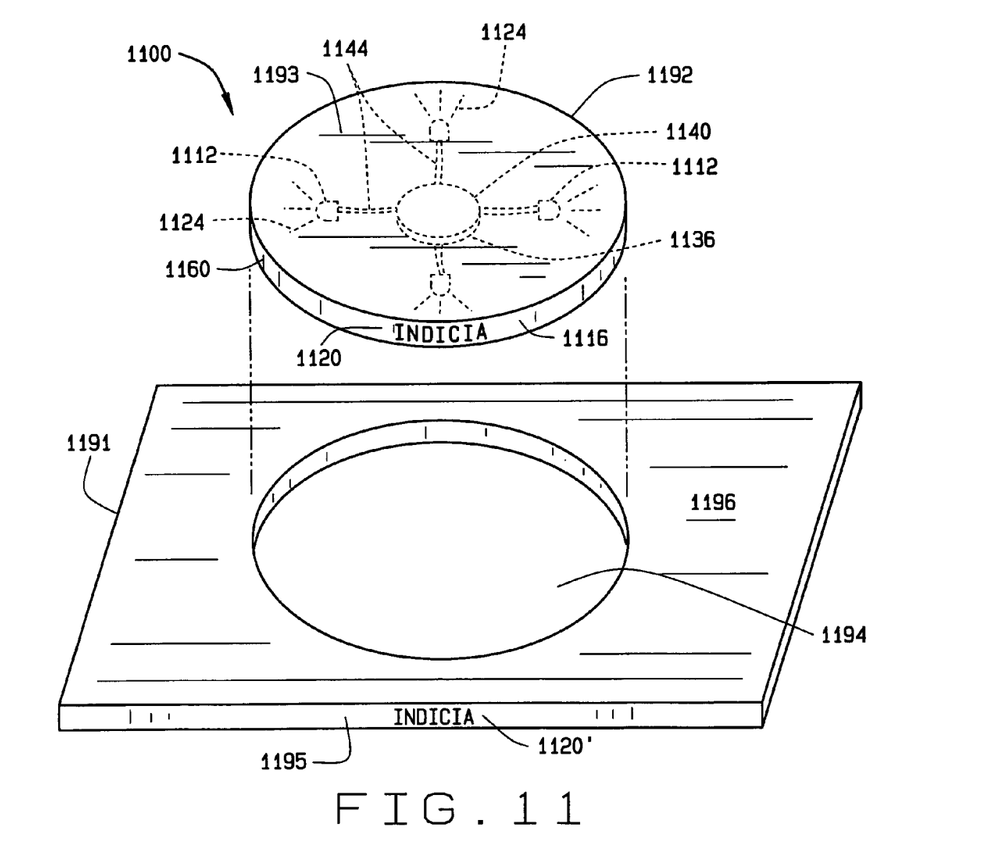
FIG. 11 is a perspective view of a lighted coaster and placemat combination according to another embodiment of the present invention.

FIG. 11 illustrates a lighted item 1100 embodying several aspects of the invention. The lighted item 1100 includes an base portion and a lighted removable portion, which in the illustrated embodiment are in the form of a placemat 1191 and a lighted coaster 1192, respectively, each having a relatively low profile. The base portion and the lighted removable portion should not be limited to the exemplary tablemat and coaster combination shown in FIG. 11 as these configurations are shown for illustrative purposes only and not for purposes of limitation.

With further reference to FIG. 11, indicia 1120 is defined along a light-transmissive sidewall portion 1116 of the coaster 1192. The indicia 1120 can be formed (e.g., with a cutting tool, knife, razor blade, laser, chemically etched, drilled, etc.) at a sufficient depth into the sidewall portion 1116 and/or at an angle relative to the direction of travel of the light 1124 so as to increase the light transmissibility and/or accentuation of the indicia 1120 by the light 1124 and/or to allow the indicia 1120 to alter (e.g., capture, refract, disperse, diffuse, diffract, etc.) light 1124. Additionally, or alternatively, indicia can be defined in other methods (e.g., by using optical fibers) and by other portions of the coaster 1192, such as the coaster top surface 1193.

The coaster 1192 includes four LEDs 1112, although other quantities of LEDs and/or other suitable light source types can be employed. Conductive leads 1144 connect the LEDs 1112 with at least one power source 1140 (e.g., a watch battery, etc.) within a power source compartment 1136 defined by the coaster 1192.

When connected to the power source 1140, the LEDs 1112 emit light 1124 which highlights the indicia 1120 defined along the coaster sidewall 1160 and/or elsewhere. The coaster 1192 can be configured (e.g., shaped, sized, have opaque portions, formed of suitable materials, etc.) so as to at least help direct light through the coaster 1192 and/or towards the indicia 1120. In this exemplary manner, the amount of light available for highlighting the indicia 1120 can be increased.

The coaster 1192 is sized to be received within an opening 1194 defined by the placemat 1191. The coaster 1192 may be engaged with the placemat 1191 using any suitable fastening system or method (e.g., a threaded connection, an interference fit, resilient ribs, among others). In one embodiment, the opening 1194 is sized to frictionally receive and form an interference fit with the coaster 1192 such that an external force must be applied to the coaster 1192 to remove the coaster 1192 from the opening 1194. In this exemplary manner, the coaster 1192 can be retained within the opening 1194 during normal use. This also allows the coaster 1192 to be readily removed from the opening 1194, for example, to substitute or replace the coaster 1192 or the placemat 1191.

In some embodiments, indicia 1120' are also defined along a light-transmissive sidewall portion 1195 of the placemat 1191. The indicia 1120' can be formed (e.g., etched, carved, etc.) at a sufficient depth into the sidewall portion 1195 and/or at an angle relative to the direction of travel of the light so as to increase the light transmissibility and/or accentuation of the indicia 1120' and/or to allow the indicia 1120' to alter (e.g., capture, refract, disperse, diffuse, diffract, etc.) light 1124'.

Additionally, or alternatively, indicia can be defined by other methods (e.g., by using optical fibers, etc.) and by other portions of the placemat 1191, such as the placemat's top surface 1196.

When the coaster 1192 is within the placemat opening 1194, light 1124 from the LEDs 1112 passes through the coaster's sidewall 1160 and into the placemat 1191. In this exemplary manner, the placemat indicia 1120' can be illuminated with light from the LEDs 1112. The placemat 1191 may have means for inhibiting light from inadvertently escaping out of the placemat 1191. For example, the placemat 1191 can be configured (e.g., shaped, sized, have opaque portions, formed of suitable materials, etc.) so as to at least help direct light through the placemat 1191 and/or towards the indicia 1120'. In this exemplary manner, the amount of light available for highlighting the indicia 1120' can be increased.

Various embodiments can include a plurality of interchangeable placemats each defining an opening for receiving the coaster 1192. The placemats can have a variety of sizes, configurations, shapes, decorations, and define different indicia. For example, the lighted coaster 1192 may be used in a generally rectangular placemat decorated with a Christmas motif as well in a generally oval shaped placemat decorated with a Thanksgiving motif. In various embodiments, the lighted coaster 1192 can also include a controller (e.g., an integrated circuit/printed circuit assembly and at least one switch) for controlling the operation of the light sources 1112 such that the lighted coaster 1192 produces thematic light (e.g., certain colors, etc.) consistent with the particular theme or motif associated with the placemat. For example, when the coaster 1192 is being used with a placemat decorated with a Christmas motif, a user can access the controller's switch to cause the LEDs 1112 to emit light that phases between the colors green and red.

Various embodiments can include a plurality of interchangeable coasters each sized to be received within an opening 1194 defined by the placemat 1191. The various lighted coasters may each define different indicia and/or be decorated differently. For example, one coaster may be decorated with a Christmas motif, another can be decorated with a Thanksgiving motif, and yet another can be decorated in a Halloween motif. Accordingly, any of these coasters may be used with the placemat 1191 depending on which holiday is being celebrated. In addition, various embodiments can include coasters that produce thematic light (e.g., certain colors, etc.) consistent with the particular theme or motif. For example, a coaster decorated with a Halloween motif can include one or more LEDs that produce orange and/or black colored light.

In at least some embodiments, the coaster 1192 is integral with and fixedly attached to the placemat 1191. Yet other embodiments include one or more lighted coasters 1192 but not a placemat or base portion 1191. Other embodiments include at least one placemat defining a plurality of openings each sized to receive a different one of a plurality of lighted coasters.

In still further embodiments, the coaster and/or placement (e.g., lower surface, etc.) can include a graphic element or image thereon (e.g., a scene, printed material, artwork, a graphic design, a photograph, artwork, an art print, a photographic print, etc.). The indicia can be positioned relative to the image such that the indicia when highlighted accentuate certain portions of the graphic element or image. For example, the coaster and/or placement can include a menu thereon such that the light and/or highlighted indicia accentuate prices on the menu.

FIGS. 12A, 12B, and 12C respectively illustrate a lighted fork 1200A, spoon 1200B, and knife 1200C embodying several aspects of the invention. As shown, each lighted item 1200 includes a handle 1204 and an LED 1212 within the handle 1204. Alternatively, other quantities of LEDs and/or other suitable light source types can be employed. The LED 1212 is switchably connectable via conductive leads 1244 with at least one power source 1240 (e.g., a watch battery, etc.) also disposed within the handle 1204.

When connected to the power source 1240, the LED 1212 emits light 1224 which highlights the indicia 1220. The light 1224 can be guided or conducted by the handle 1204 such that the light travels generally towards the indicia 1220. The indicia 1220 can be formed at a sufficient depth into the handle 1204 and/or at an angle relative to the direction of travel of the light so as to increase the light transmissibility and/or accentuation of the indicia 1220 and/or to allow indicia 1220 to alter (e.g., capture, refract, disperse, diffuse, diffract, etc.) light from the LED 1212.

The handle 1204 may have means for inhibiting light from inadvertently escaping out of the handle 1204. For example, the handle 1204 can be configured (e.g., shaped, sized, have opaque portions, formed of suitable materials, etc.) so as to at least help direct light 1224 generally towards the indicia 1220. This, in turn, can increase the amount of available light for highlighting the indicia 1220 and/or for illuminating adjacent surroundings. For example, light 1224 from the LED 1212 can illuminate a food item on the tines 1297A of the fork 1200A, within the bowl portion 1298A of the spoon 1200B, or being cut by the cutting edge 1299C of the knife 1200C.

In FIGS. 12A and 12C, the lighted fork 1200A and knife 1200C are shown with a rotatable end cap 1248A, 1248C, respectively, that functions as a switching device for switchably connecting the LED 1212A, 1112C to the power source 1240A, 1240C. Rotating the end cap 1248A, 1248C in a first direction relative to a longitudinal axis through the handle 1204A, 1204C activates or turns on the LED 1212A, 1212C. Rotating the end cap 1248A, 1248C in the opposite direction deactivates or turns off the LED 1212A, 1212C.

As shown in FIG. 12B, the lighted spoon 1200B includes electrical terminals 1248B externally located on the handle 1204B such that a user's hand upon grasping the spoon handle 1204 causes electrical contact between the terminals 1248B, thereby completing the circuit for power delivery to the LED 1212B from the power source 1240B. Alternatively, the terminals 1248B may be located at other positions. In addition, other switching means can be employed for the lighted tableware including push-button switches, etc.

In various embodiments, the lighted item can include an ultraviolet-reactive portion, and the light source can include at least one ultraviolet light source for illuminating the ultraviolet-reactive portion with ultraviolet light. For example, the ultraviolet-reactive portion can be responsive to the ultraviolet A (UVA) radiation component of black light produced by the light source, which, in turn, produces a visually stimulating effect. Exemplary ultraviolet-reactive materials include plastic or vinyl materials containing phosphor (e.g., Zinc Sulfide, Strontium Aluminate) and fluorescent materials.

Further, the indicia in various embodiments can be formed with ultraviolet-reactive ink. Accordingly, the lighted item can include one or more indicia which are responsive to ultraviolet light, such as the UVA component of black light.

Indeed, some embodiments of the lighted item include an outer light-transmissive layer which can be reactive to ultraviolet light (e.g., responsive to the UVA component of black light), indicia formed with ultraviolet-reactive ink, and an inner or back layer including a graphic element or image thereon (e.g., a scene, printed material, artwork, a graphic design, a photograph, artwork, an art print, a photographic print, etc.) which can also be ultraviolet-reactive. In such embodiments, the light source can produce and direct ultraviolet light (e.g., black light with an UVA radiation component) at the indicia and the inner and outer layers to produce a visually pleasing display. The indicia can be positioned relative to the graphic element to accentuate certain portions of the graphic element when the indicia are highlighted.

Moreover, in any of the embodiments in which the lighted item includes an edible (e.g., frozen confection 108, candy 208, etc.), the edible, or a portion thereof, can itself be UV-reactive or responsive to black light. For example, various embodiments include an edible including a UV-reactive food additive.

In various embodiments of the invention, a wide range of materials can be used for the lighted item. The indicia can be integrally formed into the material by using a cutting tool, knife, razor blade, laser, chemically etched, drilled, etc. Exemplary materials include transparent materials, translucent materials, other light-altering materials (e.g., materials that alter light by refraction, diffraction, diffusion, and/or dispersion), flexible materials, plastic materials, vinyl materials, polystyrene, polyvinylchloride (PVC) (e.g., environmentally PVC, medical grade PVC, etc.) and materials capable of being mass produced with relatively low manufacturing costs, among other materials suitable for the intended purpose. The type of material used can depend at least in part on the particular type and intensity of light produced by the light source. Alternatively, or additionally, a light-transmissive portion may be defined by one or more openings or holes which are arranged to form indicia. These holes allow light from the light source to escape or pass through the holes, thus becoming visible to a user.

In various embodiments of the invention, a lighted item can include any suitable number of (i.e., one or more) and type of light source. Exemplary light sources include LEDs, incandescent, laser, fluorescent, phosphorescent, chemiluminescent, halogen, fiber optics, electroluminescent, neon light sources, black lights, a combination thereof, and the like.

In various embodiments of the invention, a lighted item can include a plurality of light sources, one or more of which may produce light having at least one attribute (e.g., color, intensity, blink speed, hue, saturation, brightness, etc.) different than light produced by another light source. Indeed, any of the various lighted items 100, 200, 300, 400, 500, 600, 700, 800, 900, 1100, 1200 can be configured to produce light having one or more colors depending at least in part on user preferences. User preferences may, in turn, be based on any number of factors including the event at which the lighted item is being distributed or used. For example, a lighted item which produces colored light consistent with a home team's colors can be distributed at a sporting event, such as a football game.

In various embodiments of the invention, a lighted item may include a controller for controlling operation of the light source(s) in accordance with user input to provide such features as blinking, strobing and/or color changes. The controller can include an integrated circuit/printed circuit assembly (e.g., integrated circuits in a printed circuit assembly) and at least one switch. The switch may, for example, allow the user to select from among various display modes for the light sources, such as an off-light mode, an on-light mode, a mode in which each of the light sources simultaneously emit steady or non-flashing light, a mode in which the light sources emit light intermittently, a mode in which the various light sources illuminate or blink at different times in accordance with a predetermined sequence or order, a mode in which the light sources emit light that phases between or blends colors, a mode in which the light sources emit light randomly, a mode in which the light sources pulsate to sounds, and/or a mode combining one or more of the foregoing. Such sounds may be produced by the lighted item itself (e.g., via a speaker built-in to the lighted item) or a source external to the lighted item (e.g., ambient sounds). In some embodiments, sounds can cause synchronized pulsation of the light sources of two or more different lighted items, thus providing a pleasing light pattern or effect.

The controller can also include a plurality of switches each of which can be used to control the operation of an individual light source or group of light sources. For example, the controller may include a first switch for activating and deactivating LEDs that emit white light and a second switch for activating and deactivating the LEDs that emit blue light.

Additionally, various lighted items can include a pushbutton switch for switchably connecting the light sources to the power source. The switch can be positioned within the lighted item and be coupled to an externally flexible surface portion of the lighted item such that application of external pressure upon the externally flexible surface portion activates the switch, thereby causing operation of the light source. The external pressure may, for example, be applied by the user squeezing the lighted item at the externally flexible surface portion. The switch may also allow the user to cycle through various display modes or select a particular color for the light by successively squeezing the lighted item at about the externally flexible surface portion. Additionally, the switch may also allow the user to dim or brighten the intensity of the light, for example, by holding down the switch with continuously applied pressure to the lighted item at about the externally flexible surface portion.

Various lighted items can include electrical terminals for switchably connecting the light source to the power source. For example, the electrical terminals can be located such that a user's hand upon grasping the item completes the circuit for power delivery to the light source from the power source.

In another form, the present invention provides a method that generally includes providing a lighted item having at least a first light-transmissive portion defining one or more indicia, and at least one light source positioned for directing light through the first light-transmissive portion for highlighting the indicia. The method can further include activating the light source to highlight the indicia.

In another implementation, a method generally includes activating at least one light source coupled to an item to highlight one or more indicia defined by at least a first light-transmissive portion of the item.

In yet another form, the invention also provides methods of advertising. In one implementation, a method of advertising generally includes distributing at least one item having at least a first light-transmissive portion defining an advertisement, and at least one light source positioned for directing light through the first light-transmissive portion for highlighting the advertisement. The method can further include activating the light source to highlight the advertisement. The advertising may include, e.g., indicia identifying a source (e.g., company, another party, contact information, etc.) of products or services, such as trademarks and trade names.

By highlighting the indicia in a visually stimulating and pleasing manner, various embodiments of the invention serve to reinforce or strengthen the effectiveness of the advertisement(s) being displayed by the item.

Optionally, the method may also include providing items having indicia (e.g., branded goods) for further distribution (e.g., as a promotional item) by the source or another party. In such a case, the method may also include providing the source (e.g., company) or another party with items having indicia. The source, or the another party on behalf of the source, may then further distribute the items to potential or existing customers of the products or services provided by the source.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed:

1. A lighted item comprising a light-conducting portion including one or more indicia having at least one side edge portion, a light-transmissive portion, an edible engaged to the light-transmissive portion, and at least one light source positioned to emit light into the light-conducting portion such that the light-conducting portion conducts light emitted by the light source to the at least one side edge portion of the indicia thereby highlighting the indicia and such that the light-conducting portion conducts light emitted by the light source through the light-transmissive portion thereby highlighting said edible, whereby light emitted by the light source is channeled within a material thickness of the light-conducting portion generally at the at least one edge portion of the indicia, and the light-conducting portion having means for inhibiting light from inadvertently escaping out of the light-conducting portion thereby increasing the amount of available light that highlights the indicia, wherein the one or more indicia are integrally formed at a sufficient depth into the light-conducting portion for altering light emitted by the light source into the light-conducting portion.

2. The lighted item of claim 1, wherein the one or more indicia are integrally formed into the light-conducting portion at an acute angle relative to a direction at which light emitted by the light source is transmitted through the light-conducting portion.

3. The lighted item of claim 1, wherein the edible includes one or more indicia highlighted by light emitted by the light source and passing through the light-transmissive portion into the edible.

4. The lighted item of claim 1, wherein the edible is reactive to ultraviolet light, and the light source includes an electric light source that emits ultraviolet light for highlighting the edible.

5. The lighted item of claim 1, wherein the lighted item produces colored light having a color corresponding to a flavor of the edible.

6. The lighted item of claim 1, wherein the lighted item includes a holding device coupled to the edible, the holding device including at least one sidewall having an inner surface and an outer surface, the at least one sidewall including the one or more indicia and the light-conducting portion, wherein the light source is disposed within the holding device to emit light into the at least one sidewall, whereby light emitted by the light source is channeled generally between the inner and outer surfaces of the at least one sidewall generally at the at least one edge portion of the one or more indicia for highlighting the indicia, and wherein the holding device defines a power source receptacle configured to receive at least one power source and electrically connect the power source to the light source.

7. The lighted item of claim 1, wherein the light source is disposed within the light-conducting portion, and wherein the light-conducting portion defines a power source receptacle configured to receive at least one power source and to electrically connect the power source to the light source.

8. The lighted item of claim 7, wherein the light-conducting portion includes at least one flexible portion coupled to a switching device such that movement of the flexible portion switchably connects the light source to the power source.

9. The lighted item of claim 1, further comprising electrical terminals external to the lighted item for switchably connecting the light source to a power source when a user's body electrically connects the terminals to one another.

10. The lighted item of claim 1, wherein said means for inhibiting light comprises a substantially opaque portion of the light-conducting portion.

11. The lighted item of claim 1, wherein said means for inhibiting light comprises a reflective portion of the light-conducting portion.

12. The lighted item of claim 1, wherein said means for inhibiting light comprises a faceted portion of the light-conducting portion.

13. The lighted item of claim 1, wherein said means for inhibiting light comprises a portion of the light-conducting portion configured to conduct at least some of the light through the interior of the light-conducting portion by successive internal reflections.

14. The lighted item of claim 1, wherein the lighted item includes at least one graphic element, and the indicia are positioned to accentuate at least a portion of the graphic element when the indicia are highlighted by light emitted by the light source.

15. A lighted item comprising a light-conducting portion including one or more indicia having at least one side edge portion, an element engaged to the light-conducting portion, a light-transmissive portion, and at least one light source positioned to emit light into the light-conducting portion such that the light-conducting portion conducts light emitted by the light source to the at least one side edge portion of the indicia thereby highlighting the indicia and such that the light-conducting portion conducts light emitted by the light source through the light-transmissive portion thereby highlighting said element, whereby light emitted by the light source is channeled within a material thickness of the light-conducting portion generally at the at least one edge portion of the indicia, and the light-conducting portion having means for inhibiting light from inadvertently escaping out of the light-conducting portion thereby increasing the amount of available light that highlights the indicia, wherein the indicia are responsive to black light, and the light source includes an electric light source that produces black light for highlighting the indicia.

16. The lighted item of claim 15, wherein said means for inhibiting light comprises a substantially opaque portion of the light-conducting portion.

17. The lighted item of claim 15, wherein said means for inhibiting light comprises a reflective portion of the light-conducting portion.

18. The lighted item of claim 15, wherein said means for inhibiting light comprises a faceted portion of the light-conducting portion.

19. The lighted item of claim 15, wherein said means for inhibiting light comprises a portion of the light-conducting portion configured to conduct at least some of the light through the interior of the light-conducting portion by successive internal reflections.

20. A lighted item comprising a light-transmissive element, at least one light source positioned to emit light through the light-transmissive element, one or more indicia etched into the light-transmissive element to receive light emitted by the light source via the light-transmissive element and to alter the light for highlighting the indicia the indicia being etched at a sufficient depth into the light-transmissive element such that the light is captured by one or more edges of the indicia, and an edible coupled to the light-transmissive element to receive light emitted by the light source via the light-transmissive element for highlighting the edible, wherein the indicia are etched into the light-transmissive element at an acute angle relative to a direction at which light emitted by the light source is being transmitted through the light-transmissive element.

21. The lighted item of claim 20, wherein the indicia are etched into the light-transmissive element at an acute angle of about forty-five degrees relative to the direction of travel of the light.

* * * * *